(12) United States Patent
Seyffert et al.

(10) Patent No.: US 6,659,286 B2
(45) Date of Patent: Dec. 9, 2003

(54) DRAWBAR AND SCREEN SYSTEM (75) Inventors: Kenneth W. Seyffert, Houston, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 29 days.

(21) Appl. No.: 09/972,837

(22) Filed: Oct. 5, 2001

(65) Prior Publication Data
US 2003/0066786 A1 Apr. 10, 2003

(51) Int. Cl.[7] .............................. B07B 1/49; B07B 1/46
(52) U.S. Cl. ..................... 209/405; 209/403; 209/395
(58) Field of Search ................. 209/405, 403, 209/395, 325

(56) References Cited

U.S. PATENT DOCUMENTS

| | | | |
|---|---|---|---|
| 2,511,239 A | 6/1950 | Behnke et al. | |
| 2,630,225 A | 3/1953 | Bye | |
| 2,985,303 A | 5/1961 | Wright | |
| 3,092,573 A * | 6/1963 | Lambert et al. | 209/403 |
| 3,718,963 A | 3/1973 | Hawkins et al. | 29/200 D |
| 3,900,628 A | 8/1975 | Stewart | 428/134 |
| 4,040,951 A | 8/1977 | Cole | 209/408 |
| 4,224,146 A | 9/1980 | Kent et al. | 209/243 |
| 4,319,993 A | 3/1982 | Krause | 209/315 |
| 4,575,421 A * | 3/1986 | Derrick et al. | 209/397 |
| 4,582,597 A | 4/1986 | Huber | 204/313 |
| 4,744,898 A | 5/1988 | Bailey | 210/236 |
| 4,820,407 A | 4/1989 | Lilie | 209/397 |
| 4,846,352 A | 7/1989 | Bailey | 209/399 |
| 4,882,054 A | 11/1989 | Derrick et al. | 210/389 |
| 5,143,223 A * | 9/1992 | Herren | 209/405 |
| 5,299,692 A | 4/1994 | Nelson et al. | 209/2 |
| 5,332,101 A | 7/1994 | Bakula | 209/403 |
| 5,811,003 A | 9/1998 | Young et al. | 210/388 |
| 5,927,511 A * | 7/1999 | Riddle et al. | 209/405 |
| 6,006,923 A * | 12/1999 | Helmy et al. | 209/397 |
| 6,179,128 B1 | 1/2001 | Seyffert | 209/405 |
| 6,220,449 B1 | 4/2001 | Schulte, Jr. et al. | 209/401 |
| 6,401,935 B1 | 6/2002 | Wiseman | 209/403 |

FOREIGN PATENT DOCUMENTS

FR 2142789 2/1973
GB 957193 3/1964

OTHER PUBLICATIONS

Patent Application Publication US 2002/0153289 A1, Suter et al.*
Screen Heating Attachments, Coal Age, vol. 67, No. 7, Jul. 1962, p. 270.
CPI–NrG Patented Hook Attachment, CPI Group, Inc. 1990.

* cited by examiner

Primary Examiner—Donald P. Walsh
Assistant Examiner—Jonathan R Miller
(74) Attorney, Agent, or Firm—Guy McClung

(57) ABSTRACT

A clamp system for releasably securing a screen to a vibratory separator apparatus, and methods of its use, and a plate for such a system, the clamp system having, in certain aspects, a plate for contacting a screen end of a screen to be mounted to a vibratory separator apparatus, the plate having a plate linear dimension and the screen end having a screen linear dimension, the plate having a plate body, a bolt with a first end extendable through the plate and a second end extendable through part of the vibratory separator apparatus, the bolt tightenable in place to hold the plate in position with respect to the screen and the vibratory separator apparatus, and the plate linear dimension substantially equal to the screen end linear dimension.

11 Claims, 5 Drawing Sheets

DRAWBAR AND SCREEN SYSTEM

BACKGROUND OF THE INVENTION

1. Field of the Invention

This invention is directed to clamping devices and drawbars for screens mounted on vibratory screening system; to such items for tensioning screens in vibratory separators; to systems with such devices; to screens for such systems and to methods of their use.

2. Description of Related Art

There are a variety of known devices and apparatuses for securing a screen to a vibratory screening apparatus. Many of these systems employ a simple bolt, nut, and plate combination, with or without springs or shock absorbing material. Tightening and loosening of the nut provides tension adjustment. In many of the these systems, multiple screen tensioners on each end of a screen are used for each individual screen. In some cases multiple screen tensioners are required along a screen side because a tension rail may bow providing unequal tension along the screen side. The use of multiple tensioners on each screen side or end requires a relatively long time to change screens since each individual screen tensioner must be released and then tightened. Prior patents include, but are not limited to, U.S. Pat. Nos. 4,303,509; 5,332,101; 5,392,925; and 6,179,128 all of which (and all the references cited in them) are incorporated fully herein for all purposes.

Typically a screen tensioning clamp, plate, bar or member (sometimes referred to as "tension rails," drawbars," "brackets," or "side rails") has a squared-off upper edge that can wear against a shaker's basket wall or other side wall or member. One attempted prior solution to this problem was to weld a plate to a basket side wall and to position the tensioning member's upper edge so that it contacts and wears against this plate (see U.S. Pat. No. 5,332,101).

"Hookstrips" are used, as is well-known on screen ends to provide a surface or channel against which part of screen tensioner bears to tighten a screen in place on a separator or shaker apparatus. Typically such hookstrips have a squared-off outer portion that bears against and wears against a basket wall or other side wall or member. Also, a tensioning member often has a squared-off lower edge that bears against and wears against part of a hookstrip. Reduction of the wearing of these parts is desirable.

The prior art teaches that it is ideal to apply uniform screen tension in and across screen assemblies installed in vibratory separators such as, but not limited to, shale shakers. When multiple screen tensioners are used at each end of a screen, efforts have been made—which often are unsuccessful—to insure that each screen tensioner applies the same amount of tension to a screen. If part of a screen is not tensioned properly, it may not perform properly and may lead to screen damage.

U.S. Pat. No. 5,332,101 discloses a screen tensioning structure that includes body members with a cam arrangement whose movement creates a pulling effect when cam followers slide up camtracks. As shown in the patent, a plurality of screen tensioning devices are used for each individual screen with multiple screen tensioners on each end of the screen. Certain commercially available embodiments require a special wrench to turn a movable adjustment nut.

There have long been needs, recognized by the present inventors, for: an efficient screen tensioning clamp apparatus only one of which is needed on each screen end to effectively mount a screen to a vibratory separator or shale shaker; for such an apparatus that can be used with existing vibratory system screen mounts without requiring changes and alterations to the vibratory system or to the screens to be mounted thereon; for such an apparatus which is easily installed, and relatively quickly installed so that installation personnel have minimal exposure to vapors and materials associated with the use of vibratory separators; for such an apparatus that reduces misalignment between the apparatus and structural members of the vibratory system; for such an apparatus and separators with it which applies uniform tension across a screen; for tensioning apparatus with which wear on it and on parts of baskets or other side walls is reduced; for such apparatus with which friction between drawbars and basket walls is reduced; and for such an apparatus that counters the tendency of screen ends to bow out from a basket wall when screen tensioners are tightened.

SUMMARY OF THE PRESENT INVENTION

The present invention, in certain embodiments, provides a screen tension clamping apparatus that has one elongated draw bar that co-acts with a screen end hookstrip and is tensioned with a single bolt structure. In certain aspects, the single drawbar is substantially equal in length to the length of the screen end (or side) with which it is in contact. In one particular aspect the drawbar has an edge that is crescent shaped or curved to accommodate the typical slackening or bowing of the outer sides at the end of a screen that is put under tension on a vibratory separator or shaker. This curved shape insures that the ends of the screen are tightened as is the rest of the screen. Alternatively, the single drawbar has sufficient strength, e.g. by making it sufficiently large and/or massive, that tightening the drawbar prevents less tension being applied to the screen end's outer parts which can result in undesired inward bowing of a screen.

In another aspect the present invention provides a screen that has ends that are curved to compensate for the bowing of certain prior art tightened screen ends. In certain embodiments such a screen has similarly curved hookstrips to offset the curving or bowing of screen ends. In one aspect such a screen is mounted on a frame that has similarly curved ends to accommodate curved screen ends. Such a screen may or may not, according to the present invention, be mounted with the drawbars according to the present invention (drawbars with straight surfaces or, as described below, with a curved or crescent-shaped surface).

The present invention, in certain aspects, provides a vibratory screen apparatus which includes; a basket for mounting of one or more screens; one or more screens releasably mounted to the basket with any tension clamping devices described above or herein; and one or more vibratory devices for vibrating the basket and/or screen. The screens may be any screen described or disclosed herein. The screens may be mounted with any tensioner according to the present invention disclosed herein.

Using a spring of sufficient spring force that not all of the spring force is applied can facilitate correct tensioning and uniform tensioning of systems according to the present invention, i.e. such systems may be more "fool-proof" than past systems in that a substantially equal amount of tension is applied by each rail or drawbar. More uniform screen tension produces more uniform material separation results.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide new, useful, unique, efficient, nonobvious screen tension clamping apparatuses, vibratory screen systems with such apparatuses, plates for such apparatuses, and methods of their use.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIGS. 6A–6E show various tensioners according to the present invention.

DESCRIPTION OF EMBODIMENTS PREFERRED AT THE TIME OF FILING FOR THIS PATENT

Figure 1A:
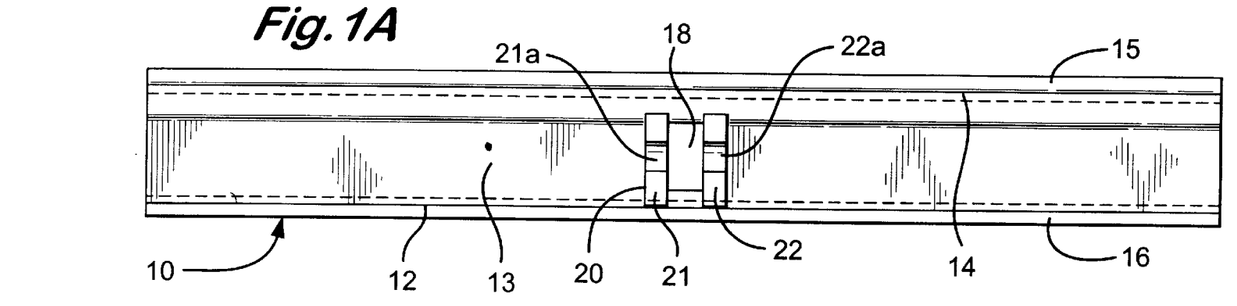
FIG. 1A is a front view of a bar of a tensioner apparatus according to the present invention.
Figure 1B:
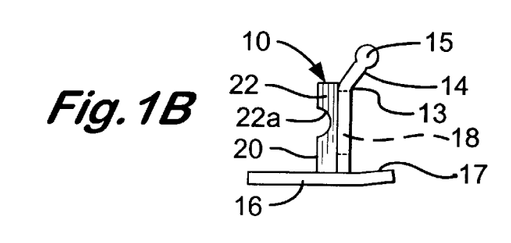
FIG. 1B is a side view of the bar of FIG. 1A.

Referring now to FIGS. 1A–1B, a screen tension clamping apparatus 10 according to the present invention has a bar 12 with a main body 13, a top part 14, a top edge 15, an optional lower member 16 (which may be used for added weight and/or added stability) with a hook portion 17, a bolt holder 20, and a bolt hole 18 through which part of a tensioning bolt extends during use.

The bolt holder 20 (which is optional) has two spaced-apart side members 21, 22 each with a recess 21a, 22a, respectively in which part of a bolt end is received and held during use.

The top edge 15 of the top part 14 of the main body 13 is, preferably, rounded (although it is within the scope of this invention for it to be squared off). By thus rounding off the top edge, friction between the top of the bar 12 and the wall of a basket of a vibratory separator is reduced. This facilitates movement of the top of the bar with respect to the basket wall which helps the bar move into correct position. Use of a rounded top edge may also inhibit unwanted wear of a side wall and of the top edge 15 against a side wall of a separator or shaker in which the apparatus 10 is used. Although the cross-section of the top edge 15 is shown as generally circular, and desired curved shaped may be used according to the present invention, including, but not limited to, an elliptical or partially elliptical shape. As shown, the top edge 15 is formed integrally of the top part 14; but it is within the scope of this invention to form a curved top edge or top part separately and to attach or connect it to the top part 14, either permanently or removably, e.g. with welding, or epoxy, or with interfitting parts or clip on structure.

As shown in FIGS. 1A and 1B the lower member 16 projects out from the bolt holder 20 and out from the main member 13 (to the left in FIG. 1B). In certain aspects, the lower member 16 is sized such that and is made of material of sufficient mass and strength such that a single apparatus 10 with such a lower member 16 effectively holds a screen in place in a vibratory separator or shale shaker and inhibits or prevents outer screen parts at a screen end from bowing inwardly and/or from being tensioned non-uniformly. In certain aspects such an apparatus 10 is made from 304 stainless steel, 316 stainless steel, or sufficiently springy carbon steel (in one aspect, nickel plated); such an apparatus 10 is, in one particular aspect, about 24½" long and about $\frac{5}{16}$" thick, with a hole 18$\frac{13}{16}$" wide and about 1½" long, with a top edge 15 having a diameter (made of 304 or 316 stainless steel round bar), in cross-section, of about ½", and a lower member 16 about 2" wide and 24.5" long (measured from the rear line of the bolt holder 20 in FIG. 1B to the distal end, to the left in FIG. 1B, of the lower member 16).

Figure 2A:
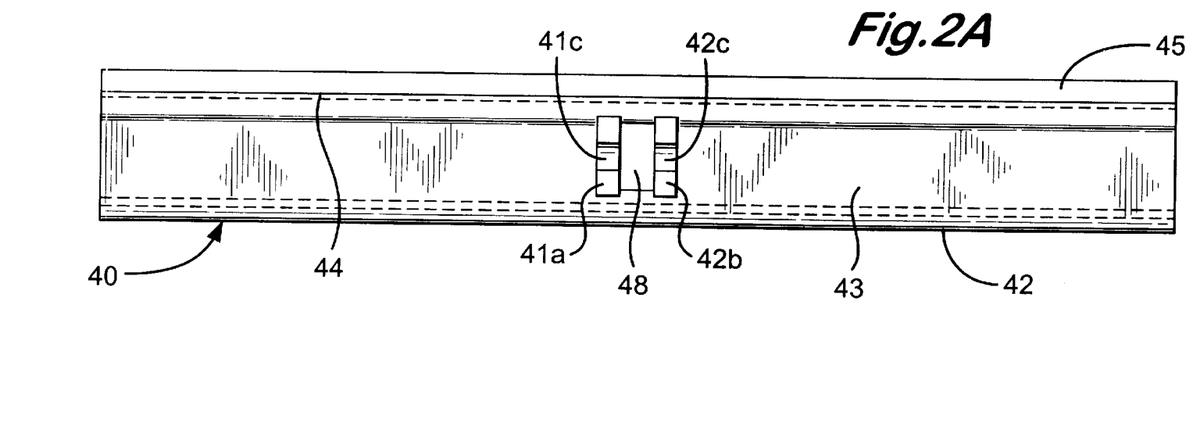
FIG. 2A is a front view of a bar of a tensioner apparatus according to the present invention.
Figure 2B:
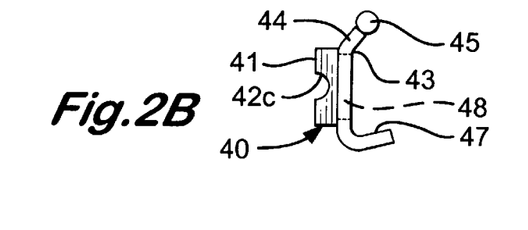
FIG. 2B is a side view of the bar of FIG. 2A.

FIGS. 2A and 2B show a screen tension clamping apparatus 40 according to the present invention that has a bar 42 with a main body 43, a top part 44, a top edge 45, with a hook portion 47, a bolt holder 41, and a bolt hole 48 through which part of a tensioning bolt extends during use.

The bolt holder 41 (which is optional) has two spaced-apart side members 41a, 42a each with a recess 41c, 42c, respectively in which part of a bolt end is received and held during use.

The top edge 45 of the top part 44 of the main body 43 is rounded to reduce friction and/or to inhibit unwanted wear of a side wall and of the top edge 15 against a side wall of a separator or shaker in which the apparatus is used.

Figure 3A:
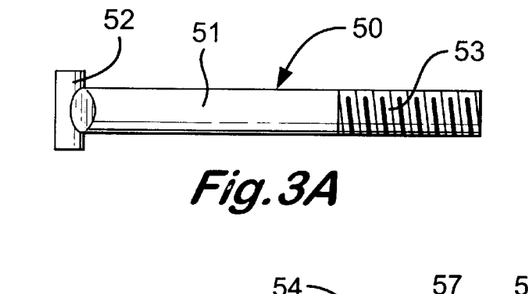
FIG. 3A is a side view of a bolt for use with tensioners according to the present invention.
Figure 3B:
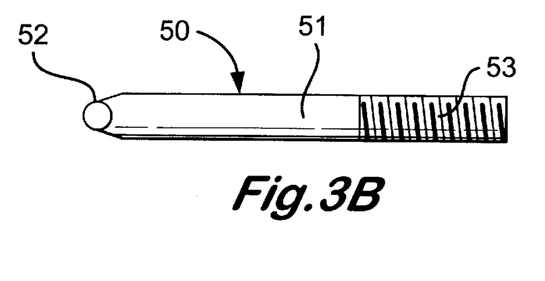
FIG. 3B is another side view of the bolt of FIG. 3A.

FIGS. 3A and 3B show a bolt 50 according to the present invention with a main bolt body 51, a T-head 52, and a threaded end 53. The T-head 52 is insertable through a hole in a drawbar (e.g., but not limited to the hole 18, FIG. 1A) and, after turning the T-head 90 degrees, the T-head is received in and rests against recesses, if present, in bolt holder sides (e.g., but not limited to as in the bolt holder 20, FIG. 1A).

Figure 4A:
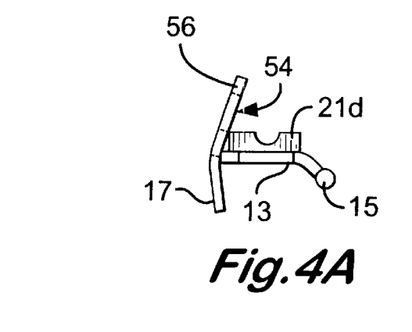
FIG. 4A is a side view of a bar of a tensioner according to the present invention.
Figure 4B:
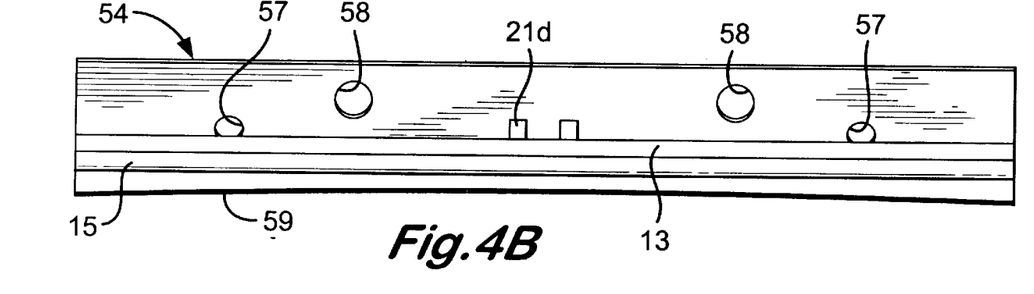
FIG. 4B is a top view of the bar of FIG. 4A.

Referring now to FIGS. 4A and 4B, a screen tension clamping apparatus 54 according to the present invention is similar to the apparatus of FIG. 1A and like numerals indicate like parts. A bar has a main body 13, and a top part with a top edge 15, an optional lower member 56 (which may be used for added weight and/or added stability) with a hook portion 17, a bolt holder 21$d$ (like the bolt holder 20, FIG. 1A), with a bolt hole (not shown-like the bolt hole 18, FIG. 1A) through which part of a tensioning bolt extends during use. The body 13 has, optionally, one or more drainage holes 57 and, optionally, one or more finger holes 58 to facilitate manipulation of the apparatus 54 [and any drawbar or plate for a rail herein may have such drain hole(s) and/or finger hole(s) and, according to the present invention, any such hole or holes may be added to any known rail, drawbar, or plate used in screen tensioners.]

As shown in FIG. 4B a rear edge 59 (the lower edge as viewed in FIG. 4B) of the main body 13 is curved or radiused so that a non-straight edge abuts a screen end or side, or hookstrip or other screen mounting apparatus on a screen end or side; thus a tendency of the main body 13 to bow is compensated for and more even tension is applied by the apparatus 54 to a screen that it is used with. As shown, the middle of the rear edge 59 of the main body 13 is about $\frac{3}{32}$" further inward (toward the top of the page in FIG. 4B as shown) as compared to the spaced-apart ends of the main body 13. However, it is within the scope of this invention for this distance to be any suitable desired distance; and, in certain particular aspects, this distance ranges between $\frac{1}{32}$" and $\frac{1}{8}$".

Figure 5A:
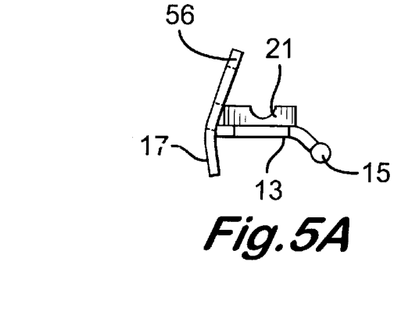
FIG. 5A is a side view of a bar of a tensioner according to the present invention.
Figure 5B:
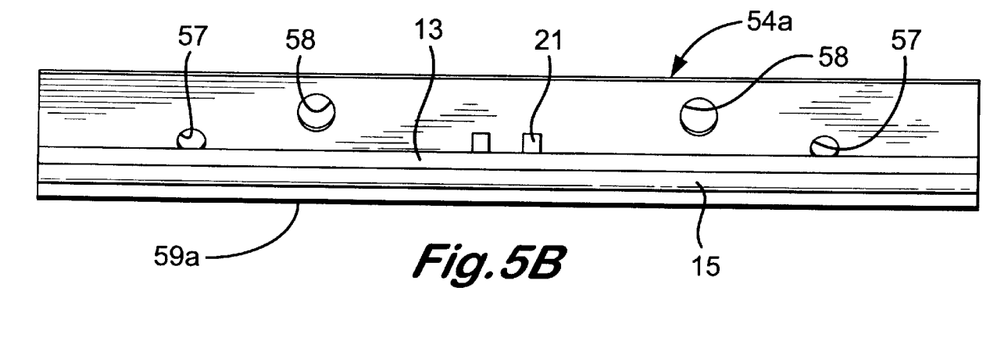
FIG. 5B is a top view of the bar of FIG. 5A.

Referring now to FIGS. 5A and 5B, an apparatus 54$a$ according to the present invention is shown which is like the apparatus 54 of FIG. 4A (like numerals indicate like parts), but which has a straight rear edge 59$a$ as viewed from above as in FIG. 5B.

Figure 6A:
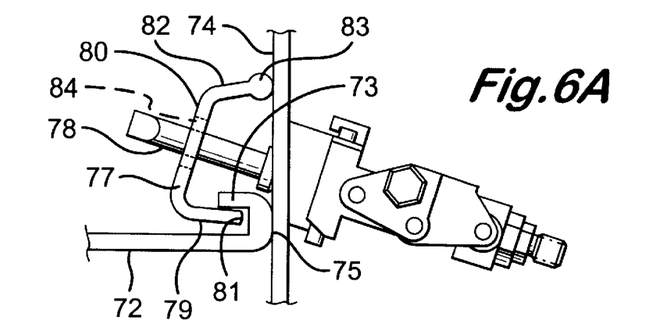
FIGS. 6A, 6B, 6C and 6E are side views.
Figure 6B:
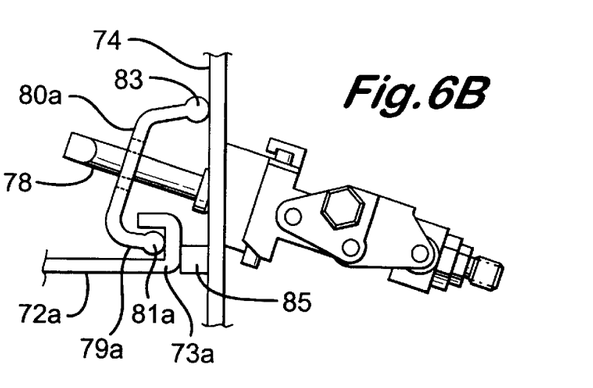

FIGS. 6A and 6B illustrate screen assembly clamps according to the present invention which are similar to those disclosed in U.S. Pat. No. 5,179,128 co-owned with the present invention and incorporated fully herein for all purposes. As shown in FIG. 6A a screen assembly 72 has hookstrips 73 along its sides (e.g. along both sides as is shown, e.g. in the apparatus of FIG. 7 or as is shown in U.S. Pat. Nos. 4,575,421 and 6,269,953 and the references cited in them—all of which patents and references are incorporated herein fully for all purposes). A basket of a separator apparatus or shaker in which the screen assembly 72 is mounted has a side wall 74 which is contacted by an outer part 75 of the hookstrip(s). The outer part 75 has a curved surface (viewed in cross-section as in FIG. 6A) to inhibit wear of the outer part 75 against the side wall 74.

A tension rail 80 has a main body 77 with a hole 84 through which projects part of a bolt tensioning apparatus 78. The tension rail 80 has a lower hook portion 79 with a curved outer edge 81 for inhibiting wear of the outer edge against the interior of the hookstrip 73. The tension rail 80 has a top part 82 with a curved top edge 83 for reducing friction and/or for inhibiting wear of the curved top edge 83 against the side wall 74 and for inhibiting wearing of the side wall itself. It is within the scope of the present invention to delete either the curved top edge 83 or the curved outer edge 81; or to delete the curved surface of the outer part 75; and it is within the scope of the present invention to use any suitable curve or non-squared off shape for these parts and surfaces to inhibit wear. It is within the scope of the present invention to use such curved parts and surfaces on any known tension clamp or tensioner for tensioning screen assemblies and to use a curved edge like the curved edge of the outer part 75 for any known hookstrip (including, but not limited to, hookstrips as disclosed in U.S. Pat. No. 6,220,449, FIGS. 2A–2C, co-owned with the present invention, and in the references cited in this patent - all of which and the patent are incorporated fully herein for all purposes).

As shown in FIG. 6B another embodiment of the tension rail 80, labelled "80$a$" in FIG. 6B, has a lower hook portion 79$a$ with a bulbous end 81$a$ for reducing friction and/or for inhibiting wear against the interior of a hookstrip 73$a$ of a screen assembly 72$a$. The hookstrip 72$a$ abuts a stop member 85. Like parts in FIGS. 6A and 6B have like identifying numerals.

Figure 6C:
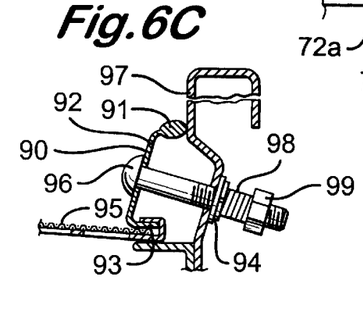

FIG. 6C shows a screen, hookstrip, and screen mounting apparatus like that disclosed in U.S. Pat. No. 4,575,421 (incorporated fully herein for all purposes); but with an upper curved portion 91 of a body 92 of a draw bar 90. A lower portion 93 of the body 92 is held against a hookstrip 94 of a screen 95 by a bolt 96 that extends through a side wall 97 of a vibrating screening machine. The upper curved portion 91 reduces friction and/or inhibits wear of this part and of the side wall 97 against which it bears. A helical compression spring 98 (which, alternatively or in addition may include one, two, or more disc springs) between a nut 99 and a washer 94 on the bolt 96 facilitates application of a desired amount of tightness and, therefore, of a desired amount of tension to the screen 95. Such a spring or springs may be used with any bolt of any system disclosed herein. In certain aspects, a spring of sufficient spring force is used so that not all of the spring force is applied which facilitates correct tensioning and uniform tensioning of systems according to the present invention and, thus, a substantially equal amount of tension is applied by each rail, plate or drawbar.

Figure 6D:
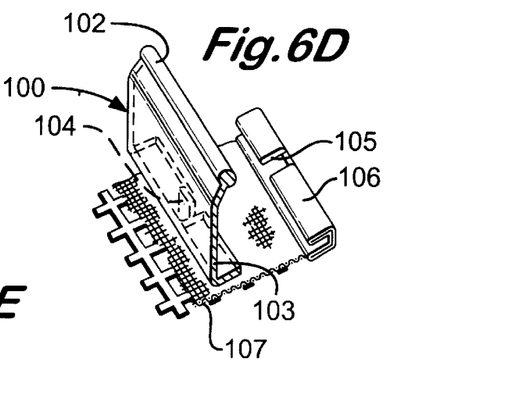
FIG. 6D is a perspective view.

FIG. 6D shows a drawbar 100 according to the present invention which is like the drawbar of Fig. 12 of U.S. Pat. No. 5,332,101 (incorporated fully herein for all purposes); but which has a rounded top edge 102 of a body 103. The rounded top edge 102 reduces friction and/or wear of a basket wall or side wall in contact with the rounded top edge 102 and/or reduces wear of the wall and of the top edge itself. The body 103 has an upturned tab 104 which enters notch 105 of a hookstrip 106 of a screen assembly 107 to correctly position the drawbar 100 with respect to the screen assembly 107. It is within the scope of the present invention to provide a rounded or curved top edge or top part, e.g., but not limited to as these of FIG. 1B, 6C or 6D, for any known drawbar or tension rail.

Figure 6E:
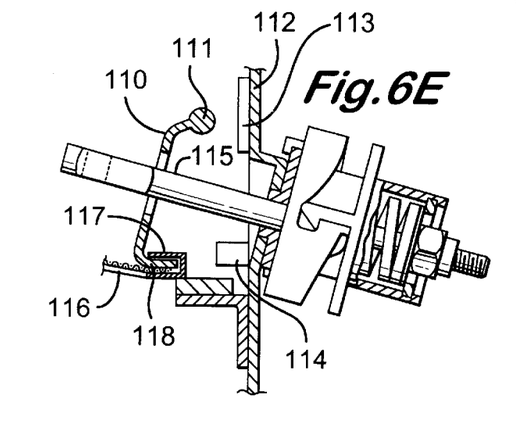

FIG. 6E shows a drawbar 110 according to the present invention like a drawbar 23 as disclosed in U.S. Pat. No. 5,332,101; but with an upper rounded part 111. The drawbar 110 may be used in a basket 112 which has a plate 113 welded to its side wall (or walls). Optionally stop block(s) 114 may be used and, although a bolt tensioner 115 as disclosed in U.S. Pat. No. 5,332,101 is shown, any suitable bolt or bolt tensioner may be used according to the present invention, A screen 116 has a hookstrip 117 in which is disposed a lower part 118 of the drawbar 110.

Figure 7:
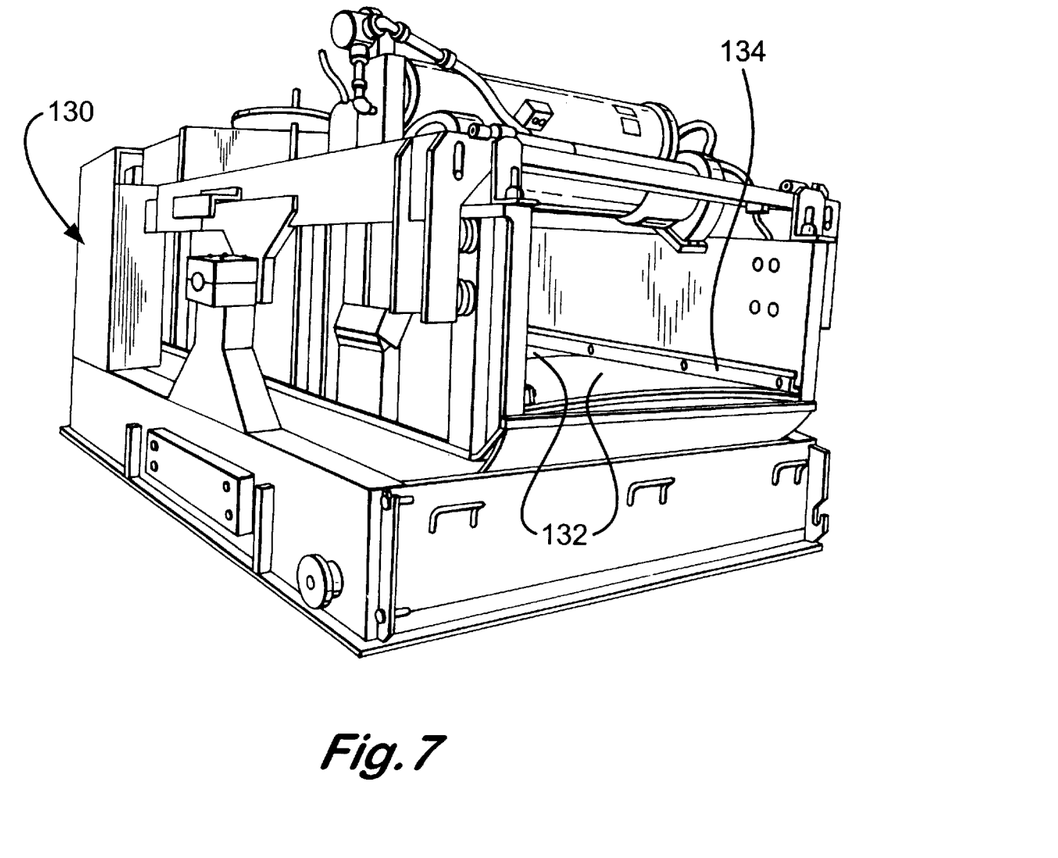
FIG. 7 is a perspective view of a vibratory separator apparatus according to the present invention with screen tensioners according to the present invention.

FIG. 7 shows a shale shaker 130 according to the present invention with multiple screen assemblies 132 mounted therein. Each end of a screen assembly 132 is tensioned in place by a single tensioner 134 (like any tensioner or tensioning apparatus according to the present invention described herein). It is also to be understood that, although the shale shaker 130 is like one shown in U.S. Pat. No. 5,332,101, any suitable known vibratory separator or shale shaker may be used, including, but not limited to any disclosed in any patent or reference referred to herein.

Figure 8A:
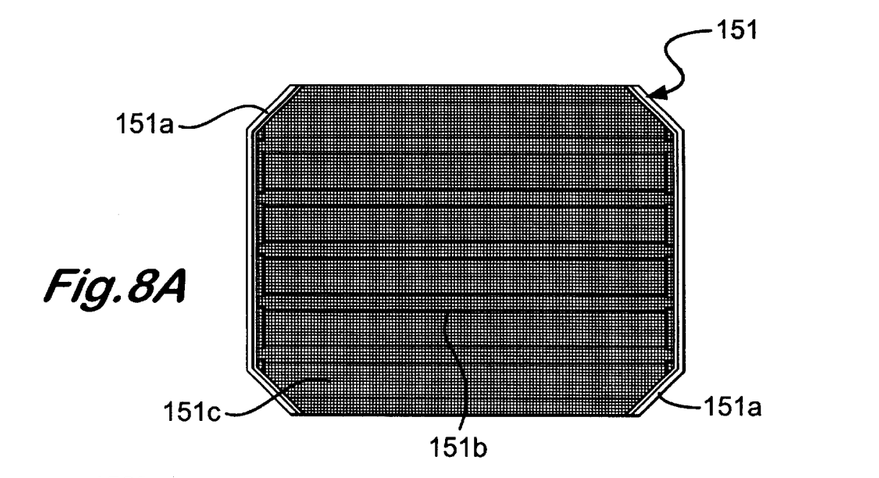
FIGS. 8A–8C are top views of screen apparatus according to the present invention.
Figure 8B:
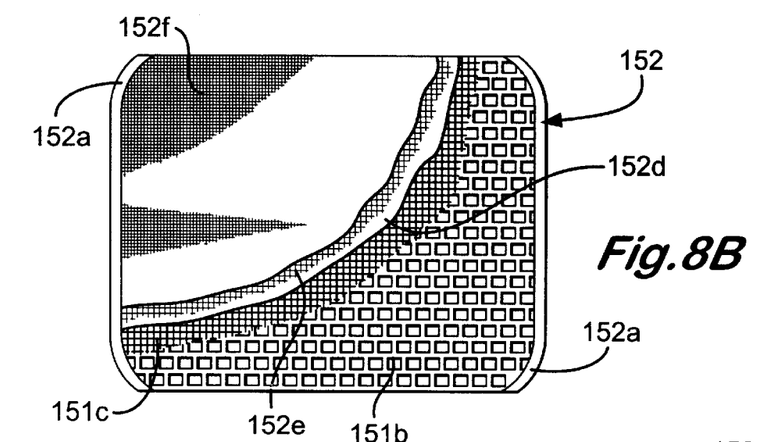
Figure 8C:
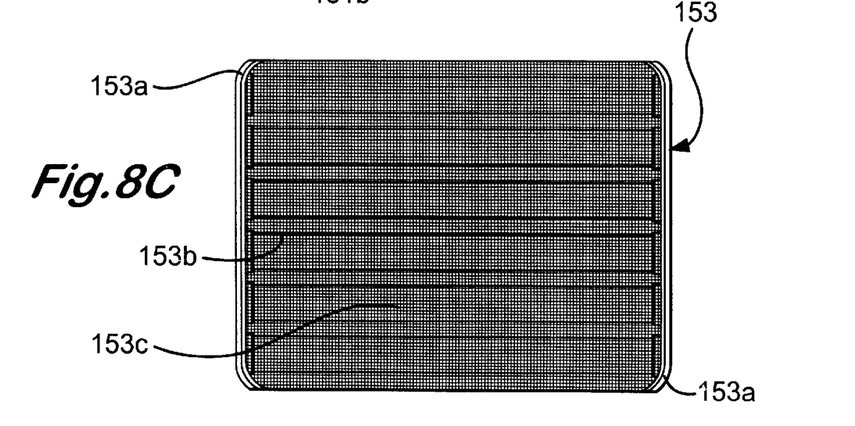

FIGS. 8A–8C show screen assemblies 151, 152, and 153 respectively, according to the present invention, each of which has screen ends with bars, frame pieces, tubular members (none shown) or as shown, hookstrips 151a, 152a, and 153a, respectively (all bars, etc. referred to collectively as "curved end members"), which are not straight, but which have curved or angled portions at the outer edges of the ends. The in-turned hookstrips at the screen ends shown in FIGS. 8A–8C will contact a drawbar extending from one side of the screen end to the other (top to bottom as viewed in FIGS. 8A–8C) before other portions of the hookstrip; thus the tendency of the screen ends' outer parts to be un-tensioned or tensioned less than the remainder of the screen is reduced or eliminated. The hookstrips at the outer edges of the screen ends may be turned in or curved inwardly as shown in FIGS. 8A–8C or, according to the present invention, they may be turned in or curved inwardly any desired amount. The screen end members' turned-in or curved-in parts apply tension to the screens both longitudinally and laterally (top to bottom and side to side as viewed in FIGS. 8A–8C). Any desired amount of curvature or turning-in may be used, and, in certain aspects, such amount is between three to fifteen degrees.

A perforated plate 152b is, optionally, provided with the screen 152 and strip supports 151b and 153b are, optionally, provided with the screens 151 and 153, respectively. Any known perforated plate or strip support may be used with any of the screens 151–153 and these screens may have any known layer(s) of screening material connected and/or bonded and/or glued in any known way to a support and/or to each other.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventor may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A clamp system for releasably securing a screen to a vibratory separator apparatus, the clamp system comprising a plate for contacting a screen end of a screen to be mounted to a vibratory separator apparatus, the plate having a plate body, a bolt with a first end extendable through the plate and a second end extendable through part of the vibratory separator apparatus, the bolt tightenable in place to hold the plate in position with respect to the screen and the vibratory separator apparatus, a bolt holder on the plate through which the bolt extends, wherein the bolt has a head with two bolt portions extending out from the head and the bolt holder has two open recesses therein, each recess for receiving one of the bolt portions extending out from the head, each bolt portion having a generally circular cross-section and the open recesses each having a generally semi-circular shape for receiving part of a bolt portion, the bolt holder positioned on the plate for projecting inwardly of the vibratory separator apparatus, the bolt having a first end with a head and a second end that is threaded, and the clamp system further comprising an adjusting nut for threadedly engaging the second end of the bolt, yieldably urging means between the adjusting nut and the head, and the yieldably urging means comprising at least one spring around the bolt and disposed between the adjusting nut and the head.

2. The clamp system of claim 1 wherein the plate body has a rear edge for abutting a screen end, the rear edge substantially straight.

3. The clamp system of claim 1 wherein the plate body has a rear edge for abutting a screen end, the rear edge curved.

4. The clamp system of claim 1 wherein the plate body has a hook portion for engaging a screen mounting apparatus on a screen.

5. The clamp system of claim 4 wherein the hook portion has a lower part that is rounded off.

6. The clamp system of claim 1 wherein the plate body has an upper part that is rounded off, the upper part for contacting a portion of a vibratory separator.

7. The clamp system of claim 1 wherein the plate body has a lowest end and the clamp system further comprising a lower member connected to the lowest end of the plate body and at an angle to the plate body.

8. The clamp system of claim 7 wherein the lower member has a lower member length substantially equal to the plate length.

9. A clamp system for releasably securing a screen to a vibratory separator apparatus, the clamp system comprising a plate for contacting a screen end of a screen to be mounted to a vibratory separator apparatus, the plate having a plate body, a bolt with a first end extendable through the plate and a second end extendable through part of the vibratory separator apparatus, the bolt tightenable in place to hold the plate in position with respect to the screen and the vibratory separator apparatus, a bolt holder on the plate through which the bolt extends, wherein the bolt has a head with two bolt portions extending out from the head and the bolt holder has two open recesses therein, each recess for receiving one of the bolt portions extending out from the head, each bolt portion having a generally circular cross-section and the open recesses each having a generally semi-circular shape for receiving part of a bolt portion, the bolt holder positioned on the plate for projecting inwardly of the vibratory separator apparatus, the plate body having a rear edge for abutting a screen end, the rear edge curved, and the plate having two opposed ends and the plate rear end has a center portion that is spaced inwardly of the plate between one-thirty second of an inch and one-eighth of an inch as compared to the two opposed ends.

10. A clamp system for releasably securing a screen to a vibratory separator apparatus, the clamp system comprising a plate for contacting a screen end of a screen to be mounted to a vibratory separator apparatus, the plate having a plate body, a bolt with a first end extendable through the plate and a second end extendable through part of the vibratory separator apparatus, the bolt tightenable in place to hold the plate in position with respect to the screen and the vibratory separator apparatus, a bolt holder on the plate through which the bolt extends, wherein the bolt has a head with two bolt portions extending out from the head and the bolt holder has two open recesses therein, each recess for receiving one of the bolt portions extending out from the head, each bolt portion having a generally circular cross-section and the open recesses each having a generally semi-circular shape for receiving part of a bolt portion, the bolt holder positioned on the plate for projecting inwardly of the vibratory separator apparatus, the plate body having a lowest end and the clamp system further comprising a lower member connected to the lowest end of the plate body and at an angle to the plate body, the lower member having at least one drain hole therethrough.

11. A clamp system for releasably securing a screen to a vibratory separator apparatus, the clamp system comprising a plate for contacting a screen end of a screen to be mounted to a vibratory separator apparatus, the plate having a plate body, a bolt with a first end extendable through the plate and a second end extendable through part of the vibratory separator apparatus, the bolt tightenable in place to hold the plate in position with respect to the screen and the vibratory separator apparatus, a bolt holder on the plate through which the bolt extends, wherein the bolt has a head with two bolt portions extending out from the head and the bolt holder has two open recesses therein, each recess for receiving one of the bolt portions extending out from the head, each bolt portion having a generally circular cross-section and the open recesses each having a generally semi-circular shape for receiving part of a bolt portion, the bolt holder positioned on the plate for projecting inwardly of the vibratory separator apparatus, the plate body having a lowest end and the clamp system further comprising a lower member connected to the lowest end of the plate body and at an angle to the plate body, the lower member having at least one finger hole therethrough.

* * * * *